United States Patent [19]

Kawai et al.

[11] 4,252,669

[45] Feb. 24, 1981

[54] LUMINESCENT MATERIAL AND METHOD OF MAKING THE SAME

[75] Inventors: Hiroji Kawai; Tomohiko Abe, both of Yokohama; Shigeru Yokono, Tokyo; Teruhiko Hoshina, Yokohama, all of Japan

[73] Assignee: Sony Corporation, Tokyo, Japan

[21] Appl. No.: 76,856

[22] Filed: Sep. 19, 1979

[30] Foreign Application Priority Data

Sep. 25, 1978 [JP] Japan .................. 53-117614
Sep. 25, 1978 [JP] Japan .................. 53-117615

[51] Int. Cl.$^3$ ............................................. C09K 11/46
[52] U.S. Cl. ............................................. 252/301.6 S
[58] Field of Search ................................ 252/301.6 S

[56] References Cited

U.S. PATENT DOCUMENTS

3,269,956  8/1966  Larach et al. ............. 252/301.6 S
3,459,667  8/1969  Larach et al. ............. 252/301.6 S

OTHER PUBLICATIONS

Peters, "J. Electrochem. Soc.: Solid State Science", 1969, p. 985.

*Primary Examiner*—Jack Cooper

*Attorney, Agent, or Firm*—Hill, Van Santen, Steadman, Chiara & Simpson

[57] ABSTRACT

A luminescent material is disclosed which has the general formula:

$$Zn_{1-x}Cd_xS:Ce_y, M_z$$

wherein M is at least one alkali metal selected from Li, Na, K, Rb, and Cs, x is from about 0 to about 0.3, y and z are densities (g-atom/mol $Zn_{1-x}Cd_xS$) of Ce and M relative to $Zn_{1-x}Cd_xS$, y is from about $7 \times 10^{-6}$ to about $1.5 \times 10^{-2}$, and z is from about $7 \times 10^{-6}$ to about $1.5 \times 10^{-2}$.

A method for making a luminescent material having the general formula:

$$(ZnCd)S:Ce,M$$

wherein M is at least one alkali metal selected from Li, Na, K, Rb and Cs is disclosed which comprises the steps of preparing a mixture of (ZnCD)S:Ce compound, and alkali metal compound, heating the mixture under non-oxidizing atmosphere at a temperature between about 900° C. and about 1170° C., and quenching said mixture from said temperature.

5 Claims, 7 Drawing Figures

LUMINESCENT MATERIAL AND METHOD OF MAKING THE SAME

BACKGROUND OF THE INVENTION

1. Field of the Invention

The present invention relates generally to phosphor which is short in decay time and is directed more particularly to special phosphor (ZnCd)S:Ce, M which is of high peak intensity of light emission and suitable for use as a phosphor screen of a flying spot scanner tube or phosphor of a beam indexing color cathode ray tube for deriving an index signal and so on, and also to method of making the phosphor.

2. Description of the Prior Art

In the phosphor used as the phosphor screen of a flying spot scanner tube or the phosphor of a beam indexing color cathode ray tube for deriving an index signal, it is especially required that the attenuating time i.e. decay time of its light emission is as short as possible. Further, in order to improve the S/N ratio of a signal processing circuit therefor, it is desired that the intensity of light emission of phosphor is as high as possible so as to derive a large output from a detecting element such as a photo-diode.

In the art, as a phosphor which emits, for example, ultraviolet rays, $Ca_2 Mg Si_2O_7$:Ce (P 16 phosphor) or $Y_2 Si_2O_7$:Ce is used; as a phosphor which emits blue light, $Y_2SiO_5$:Ce or ZnO:Zn is used; and as a phosphor which emits green light, $Y_3Al_5O_{12}$:Ce (P 46 phosphor) or $GdAlGaO_4$:Ce is used, respectively.

Among these phosphors, the P 46 phosphor is greatest in intensity of light emission, but in view of improving the S/N ratio and so on, a phosphor, which is higher than the P 46 phosphor in intensity of light emission and shorter in decay time, is desired.

OBJECTS AND SUMMARY OF THE INVENTION

Accordingly, an object of the present invention is to provide a novel phosphor.

Another object of the invention is to provide a phosphor which is higher in intensity of light emission and shorter in decay time than the prior art P 46 phosphor.

A further object of the invention is to provide a phosphor whose general formula is expressed as follows:

$$Zn_{1-x}Cd_xS:Ce_y, M_z \quad (1)$$

where M is at least one of alkali metals and x, y, z satisfy the following conditions:

$$0 \leq x < 0.3$$

$$7 \times 10^{-6} < y < 1.5 \times 10^{-2}$$

$$7 \times 10^{-6} < z < 1.5 \times 10^{-2}$$

In this case, y and z are atomic ratio for $Zn_{1-x}Cd_xS$ (g—atom/mol $Zn_{1-x}Cd_xS$).

A further object of the invention is to provide a method of making the phosphor.

According to an example of the present invention, there is provided a luminescent material having the general formula:

$$Zn_{1-x}Cd_xS:Ce_y, M_z$$

wherein M is at least one alkaline metal selected from Li, Na, K, Rb, and Cs, x is from about 0 to about 0.3, y and z are densities (g-atom/mol $Zn_{1-x}Cd_xS$) of Ce and M relative to $Zn_{1-x}Cd_xS$, y is from about $7 \times 10^{-6}$ to about $1.5 \times 10^{-2}$, and z is from about $7 \times 10^{-6}$ to about $1.5 \times 10^{-2}$.

Further, there is provided a method for making a luminescent material having the general formula:

$$(ZnCd)S:Ce, M$$

wherein M is at least one alkali metal selected from Li, Na, K, Rb and Cs, which comprises (1) preparing a mixture of (ZnCd)S:Ce:compound, and alkali metal compound, (2) heating the mixture under non-oxidizing atmosphere at a temperature between about 900° C. and about 1170° C., and (3) quenching said mixture from said temperature.

The other objects, features and advantages of the present invention will become clear from the following description taken in conjunction with the accompanying drawings.

DESCRIPTION OF THE PREFERRED EMBODIMENTS

According to a synthesizing method of an ordinary ZnS phosphor, suitable amount of activator, co-activator and flux are added to precipitated Zn S powders and then mixed by a mixer. The resultant mixture is dried, then burnt or fired in several hours by a furnace which is kept in atmosphere of $H_2S$ gas, $CS_2$ gas or inert gas, and therefore cooled naturally or gradually in the same atmosphere to synthesize a desired phsophor. When the treatment is carried out in the gas atmosphere of $H_2S$ or $CS_2$ as set forth above, since it is almost impossible to achieve rapid cooling or quenching, in the art there has been no hints on synthesizing this kind of Zn S phosphor by rapid quenching. Further, in fact, upon sythesizing Zn S phosphor which is used as a green color phosphor or blue color phosphor of a prior art television tube or color cathode ray tube, the firing temperature and control of the atmosphere are important factor but no consideration on the cooling speed is necessary.

However, if the synthesizing method of the above Zn S phosphor is applied to synthesize the above (ZnCd)S:Ce, M, it is impossible to synthesize a phosphor which has desired characteristics.

The inventors of the present invention have discovered after experiments and observations that, in order to make (ZnCd)S:Ce, M phosphor having desired characteristics, it is necessary to employ a special method.

According to the present invention, the synthesization of the above (ZnCd)S:Ce, M phosphor is carried out under the firing at a temperature range of, especially 900° C. to 1170° C. and rapid quenching from this temperature range.

Next, an example of the present invention will be hereinafter described.

EXAMPLE 1

Figure 1:
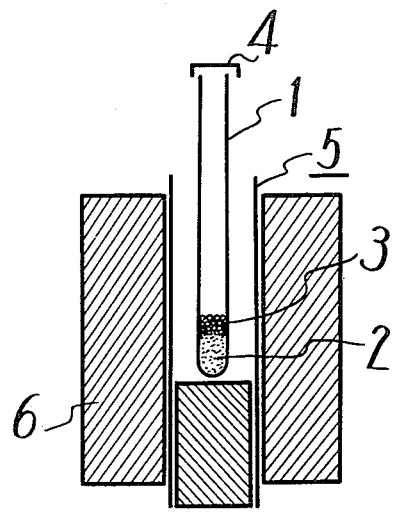
FIG. 1 is a cross-sectional view showing an example of the apparatus which is used to make a phosphor according to the present invention.

35 g of zinc sulfide of luminescence grade or high purity on market is added with aqueous solution containing 10.2 mg of cerium sulfate $Ce_2(SO_4)_3$ of 99.99% in purity and 1.52 mg of lithium chloride LiCl of 99.99% in purity. In this case, the respective concentrations of Ce and Li are selected as $10^{-4}$ in atomic ratio relative to Zn S. The resultant slurry raw material is dried on a water bath while being agitated, and then further dried in 5 hours at 120° C. 350 mg of sulfur of 99.999% is added to the dried material and the resultant mixture is mixed in a mortar. The material thus prepared is charged into a quartz tube 1, which is 30 mm in diameter and 500 mm in length and whose one end is sealed up, as indicated at 2 in FIG. 1. Then, before sealing about 10 g of activated carbon granules 3 are filled on the material 2 in the quartz tube 1 to cut off the contact of oxygen in air with the charged material 2 in the quartz tube 1, and thereafter a lid 4 made of quartz glass is placed on the open end of the quartz tube 1. The quartz tube 1 thus charged with the materials 2 and 3 therein is inserted into a vertical furnace 5 which is previously heated up at 1000° C. (hereinafter such a method that the quartz tube 1 with the material 2 charged therein is inserted into the furnace 5 heated as above will be called as a rapid heating method). In FIG. 1, 6 designates a heating means for the furnace 5.

The temperature within the furnace 5 is lowered down to 700° C. once when the quartz tube 1 is inserted thereinto, but restores to 1000° C. in 5 minutes. The materials in the quartz tube 1 are fired at this temperature 1000° C. in 2 hours, and thereafter the quartz tube 1 is moved out from the furnace 5 and then rapidly quenched by dipping the same in water.

Figure 2:
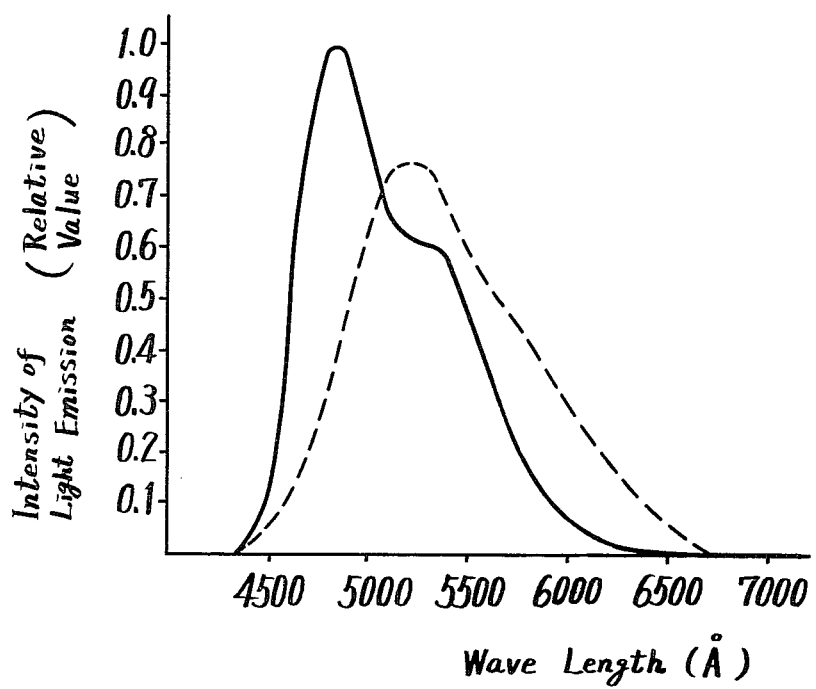
FIG 2. is a graph of the light emission spectrum of an example of the phoshpor of the invention.
Figure 3:
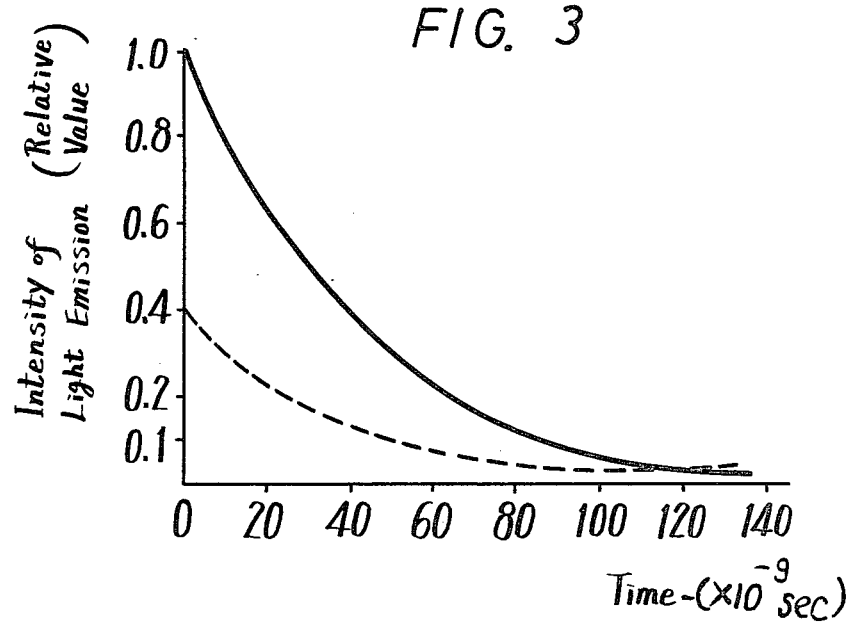
FIG. 3 is a graph showing the decay curve of the light emission.

Solid line curves in the graphs of FIGS. 2 and 3 respectively show light emission spectrum of the phosphor of Example 1, in which the concentration of Ce and Li relative to Zn S is $10^{-4}$ in atomic ratio, when the phosphor is excited by electron beam and the decay of light emission after the electron beam excitation of the phosphor is stopped. In the graphs of FIGS. 2 and 3, broken line curves represent the similar light emission spectrum and decay of light emission of the prior art P 46 phosphor, respectively.

The ordinate in the graph of FIG. 2 relatively represent the intensity of light emission of the phosphor of Example 1 with its peak intensity of emission being taken as 1, while in the graph of FIG. 3 it is taken that the intensity of light emission of the phosphor of Example 1 at the time upon stopping the electron beam excitation thereof i.e. the initial value $I_o$ in decay is taken as 1.

As will be clear from the graphs of FIGS. 2 and 3, the phosphor of Example 1 of the invention has the intensity of light emission higher than that of the prior art P 46 phosphor, sharp attenuation curve and short decay time as compared with the prior art P 46 phosphor. By the way, the intensity of light emission or initial value of decay of the phosphor of Example 1 according to the invention is increased up to 243% of that of the prior art P 46 phosphor.

Next, a phosphor is synthesized by a manner similar to that of Example 1 but under the condition that the concentration of Ce thereof for Zn S is varied from $3 \times 10^{-6}$ to $10^{-2}$ in the atomic ratio (g-atom/mol Zn S), and the similar concentration of Li is varied 0 to $10^{-2}$ in atomic ratio.

Table 1 shows the measured results of the initial values of decay of intensity of light emission or intensities $I_o$ of light emission (relative value) of respective phosphor specimens with the numbers of 1 to 17 thus synthesized at the time when its electron beam excitation is stopped, decay time $\tau 1/10$ within which the intensity of light emission is decayed to $I_o/10$, Ce concentration, and Li concentration and those of the prior art P 46 phosphor for comparision.

TABLE I

| Specimen Number | Ce concentration | Li concentration | Initial value $I_o$ | Decay time $\tau 1/10$ (x $10^{-9}$ sec) | $I_o/\tau_{1/10}$ |
|---|---|---|---|---|---|
| 1 | 100 | | 2 | 300 | 0.01 |
| 2 | 100 | 10 | 98 | 88 | 1.11 |
| 3 | 100 | 30 | 150 | 90 | 1.67 |
| 4 | 100 | 100 | 243 | 88 | 2.76 |
| 5 | 100 | 300, | 289 | 90 | 3.21 |
| 6 | 100 | 1000 | 230 | 92 | 2.50 |
| 7 | 100 | 3000 | 138 | 105 | 1.31 |
| 8 | 100 | 10000 | 45 | 110 | 0.41 |
| 9 | 100 | 30000 | 28 | 120 | 0.23 |
| 10 | 3 | 3 | 7 | | |
| 11 | 10 | 10 | 129 | 86 | 1.50 |
| 12 | 30 | 30 | 200 | 86 | 2.33 |
| 13 | 30 | 30 | 218 | 89 | 2.45 |
| 14 | 300 | 207 | 87 | 3.38 | |
| 15 | 600 | 600 | 189 | 87 | 2.17 |
| 16 | 1000 | 1000 | 204 | 89 | 2.29 |
| 17 | 10000 | 10000 | 116 | 90 | 1.29 |
| P46 | | | 100 | 120 | 0.83 | where Ce and Li concentrations are in the order of $10^{-6}$ g-atom/mol Zn S.

Figure 4:
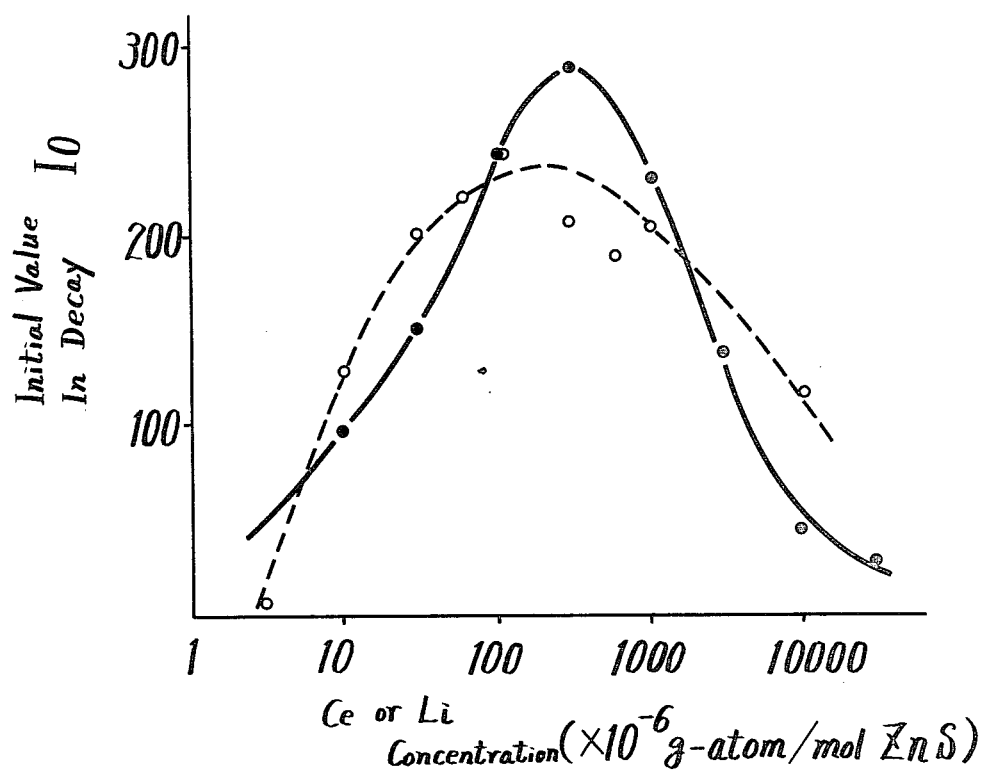
FIG. 4 is a graph showing the relation between initial value of the light emission in decay and the concentrations of Ce and Li used in the phosphor.

If the relation between the Ce or Li concentration and initial value $I_o$ intensity of light emission based upon Table I is plotted, the graph of FIG. 4 is obtained. In the graph of FIG. 4, the solid line curve shows the variation of the initial value in decay when the Ce concentration is taken as 100 and the Li concentration is varied, while the broken line curve shows the variation of the initial value in decay when the Ce and Li concentrations are kept equal but both varied.

As will be clear from the graph of FIG. 4, the phosphors, whose Ce and Li concentrations exceed $7 \times 10^{-6}$ but are smaller than $1.5 \times 10^{-2}$, more desirably exceed $1 \times 10^{-5}$ but are smaller than $4.5 \times 10^{-3}$, exhibit short decay time property as compared with the prior art P 46 phosphor.

The phosphor, which may be used in the above beam index cathode ray tube and flying spot scanner tube and made by the present invention, can be evaluated by $I_o/\tau 1/10$ from its object. It can be said that as the value $I_o/\tau 1/10$ is greater, the phosphor is superior in characteristics. From Table I, the phosphors of the invention with the specimen numbers 2 to 7 and 11 to 17 are hign in the value as compared with the prior art P 46 phosphor.

In place of Ce$_2$(SO$_4$)$_3$ used in Example I as Ce compound (Ce activator) added to Zn S, cerium nitrate Ce (NO$_3$)$_3$.6H$_2$O is used to achieve the synthesization similar to that of Example 1. Then, phosphor having the characteristics substantially same as those of Example 1 is made. Also, Li F, LiBr, Li I, Li$_2$S, Li$_2$SO$_4$ and so on are used as Li compound added to Zn S to carry out phosphor synthesizations similar to those of Example 1. The measured initial values I$_o$ of decay of intensity of light emission of the phosphors thus made (specimen numbers of 18 to 22) and the measured time $\tau 1/10$ thereof within which the intensity light of emission is decayed to 1/10 are shown in Table 2.

TABLE 2

| Specimen Number | Ce activator | Co-activator | Initial value I$_o$ | Decay time $\tau_{1/10}$ ($\times 10^{-9}$ sec) | I$_o/\tau_{1/10}$ |
|---|---|---|---|---|---|
| 18 | Ce$_2$(SO$_4$)$_3$ | Li F | 275 | 100 | 2.75 |
| 19 | " | Li Br | 238 | 110 | 2.16 |
| 20 | " | Li I | 234 | 95 | 2.46 |
| 21 | " | Li$_2$ S | 180 | 95 | 1.89 |
| 22 | " | Li$_2$SO$_4$ | 226 | 95 | 2.38 | where the concentrations of Ce activator and co-activator are 10$^{-4}$ g-atom/mol Zn S.

From the Table 2, it will be apparent that the characteristics of the phosphors are improved much as compared with the prior art P 46 phosphor from the value I$_o/\tau 1/10$ in Table 2.

In place of LiCl used in Example 1, respective sulfates of Na, K, Rb and Cs are used to achieve phosphor synthesization. The measured similar initial values I$_o$ and 1/10 decay times $\tau 1/10$ of the phosphors (specimen numbers 23 to 26) are shown in Table 3. In this case, light emission spectra of the phosphors are the substantially same as those in which Li is used.

TABLE 3

| Specimen Number | Ce activator | Co-activator | Initial value I$_o$ | Decay time $\tau_{1/10}$ ($\times 10^{-9}$ sec) | I$_o/\tau_{1/10}$ |
|---|---|---|---|---|---|
| 23 | Ce$_2$(SO$_4$)$_3$ | Na$_2$SO$_4$ | 20 | 90 | 0.22 |
| 24 | " | K$_2$SO$_4$ | 22 | 110 | 0.2 |
| 25 | " | Rb$_2$SO$_4$ | 15 | 120 | 0.13 |
| 26 | " | Cs$_2$SO$_4$ | 64 | 120 | 0.53 | where the respective Ce activator and co-activator are 10$^{-4}$ g-atom/mol Zn S and 10$^{-3}$ g-atom/mol Zn S.

Magnesium chloride is added as flux to the material of Example 1 at the atomic ratio of 1×10$^{-5}$ to 5×10$^{-3}$ for Zn S and then phosphor synthesization is performed. The phosphor thus synthesized is much improved in grain state. For example, since the respective grains or powders are not sintered, phosphor in powder can be obtained by light pressing. The light emission spectrum, decay time and initial value I$_o$ are the substantially same as those of Example 1 to which no magnesium chloride is added.

After phosphor synthesizations have been carried out by using various fluxes, it is ascertained that alkaline metal halide, alkali earth metal halide, ammonium halide, iodine and so on except fluoride are effective as flux.

Figure 5:
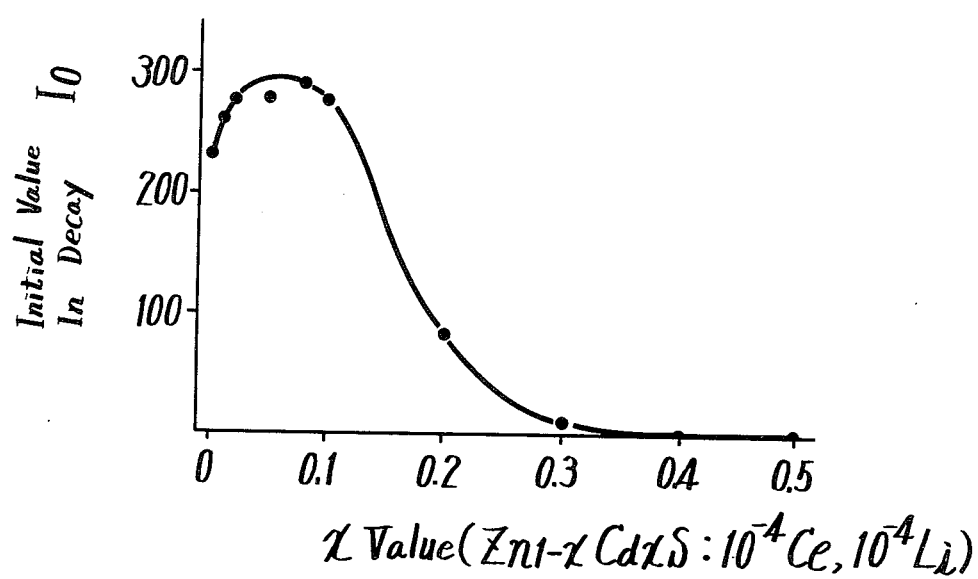
FIGS. 5 and 6 are graphs showing the relations between the amounts of Cd and the initial values of light emission (attenuation) and 1/10 decay time respectively.
Figure 6:
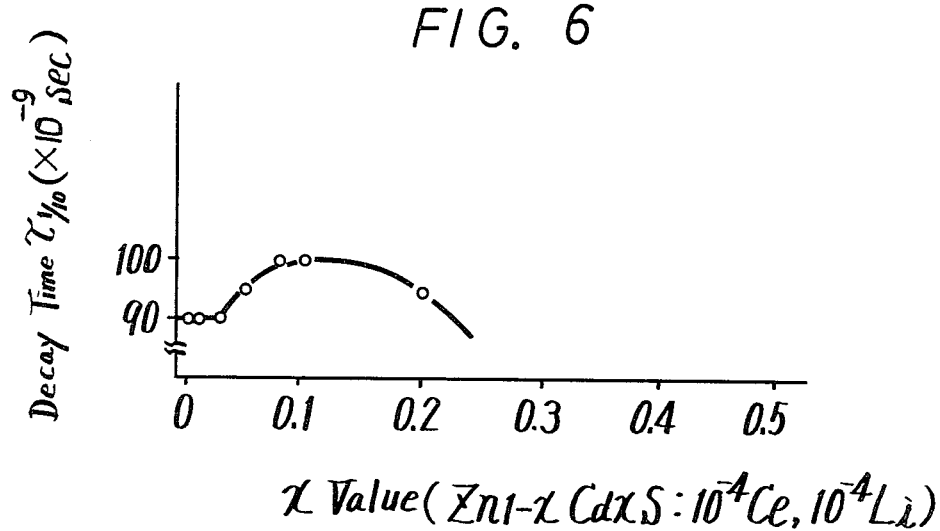

Further, in Example 1, phosphors with x as 0, 0.01, 0,02, 0.05, 0.1, 0.2, 0.3, 0.4 and 0.5 in the general formula (1) are synthesized, and their initial values I$_o$ and 1/10 decay times are measured which are shown in the graphs of FIGS. 5 and 6, respectively. As may be clear from the graphs of FIGS. 5 and 6, when Cd is added in place of a part of Zn, the decay time $\tau 1/10$ tends to be somewhat long but the initial value I$_o$ improves by, especially the addition of 1% to 10%. However, when both I$_o$ and $\tau 1/10$ are taken into consideration, the replacing amount x of Cd between 0 to 0.3 can be used.

Figure 7:
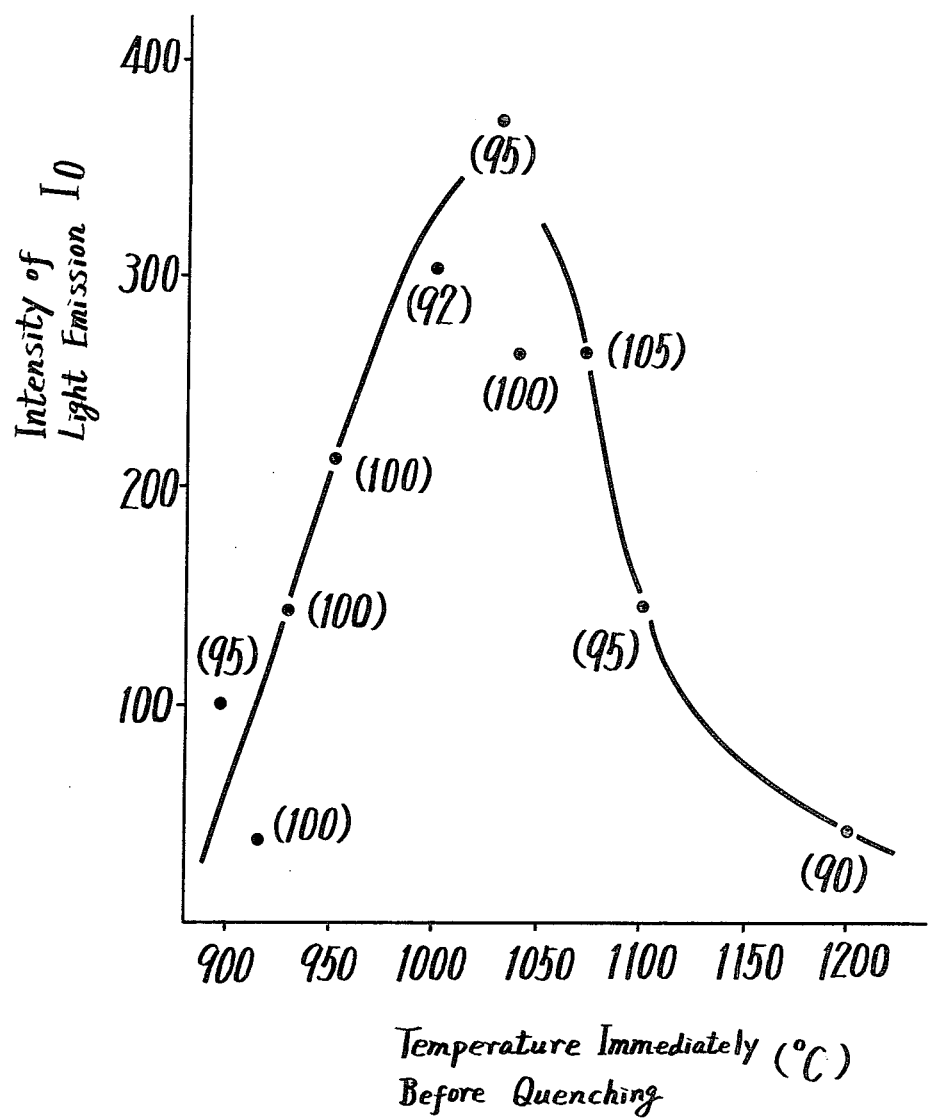
FIG. 7 is a graph showing the relation between the initial valve of light emission in decay and the temperature immediately before rapid quenching.

When the relation between temperature immediately before rapid quenching and intensity of light emission is measured in the case of method similar to Example 1 but concentrations of Ce and Li being selected as 10$^{-4}$ g-atom/mol Zn S and 3×10$^{-4}$ g-atom/mol Zn S, the result shown in the graph of FIG. 7 is obtained. In the graph of FIG. 7, the points indicated by black circles are plotted to represent the measured results of the respective specimens and the numerical values in parentheses near the respective points represent $\tau 1/10$ of the respective specimens. According to this figure, it will be clear that intensity of light emission is lowered even when the firing temperature immediately before the rapid quenching is too high and too low. The reason may be considered as follows. That is, if the firing temperature is too high, the light emission due to the afterglow becomes remarkable to lower the initial value I$_o$, while if the firing temperature is too low, no luminescent center is formed and hence light emission becomes difficult. Thus, the firing temperature is desired to be 900° C. to 1170° C. and more desirably 950° C. to 1080° C.

EXAMPLE 2

The Ce and Li concentrations for Zn S are selected as 6×10$^{-5}$ in atomic ratio and the material is fired at 1000° C. as similar to Example 1. Thereafter, the quartz tube 1 is removed from the furnace 5 and cooled in air. In this case, this air cooling can be substantially deemed as rapid quenching, since the amount of specimen is small. The phosphor thus made is taken as a specimen of 27.

The material fired by the manner of Example 1 is gradually cooled down to 300° C. at the cooling speed of 2° C. per minute and then left in air or rapidly quenched. This phosphor is taken as a specimen of 28.

The material is fired by the manner of Example 1, and thereafter the quartz tube 1 is cooled by stopping the supply of electric power to the heating means 6 while being kept in the furnace 5. The phosphor thus made is taken as a specimen of 29. At this time, the lowering of temperature is about 1000×e$^{-0.46}$ t (t is hour). This calculates to be 7.7° C./Minute.

The measured initial values I$_o$ of intensity of light emission of the specimens 27, 28 and 29 and 1/10 decay times $\tau 1/10$ thereof are shown in Table 4.

TABLE 4

| Specimen Number | | Initial value I$_o$ | Decay time $\tau_{1/10}$ ($\times 10^{-9}$ sec) | I$_o/\tau_{1/10}$ |
|---|---|---|---|---|
| 27 | | 204 | 90 | 2.26 |
| 28 | Ce, Li concentration | 000 | | |
| 29 | 6 × 10$^{-5}$ g-atom/ mol Zn S | 22 | 90 | 0.24 |
| P 46 | | 100 | 120 | 0.83 |

It will be clear from Table 4 that not only the above-described firing temperature but also the cooling condition after firing affect on the characteristics of the phosphors much, which may be resulted from that if gradual cooling is achieved, the luminescent center of Ce is transformed and hence no light emission appears. Therefore, the relation between the quenching temperature and light emission characteristics of the phosphor is further investigated. That is, four quartz tubes 1, each containing the material 2 similar to that of Example 1 as shown in FIG. 1, are prepared and then rapidly heated at the same furnace 5 to carry out the firing treatment in two hours at 1000° C. Then, one quartz tube 1 is removed from the furnace 5 and rapidly quenched in water. The material thus made is taken as a specimen of 30. The remaining three quartz tubes 1 are gradually cooled to 950° C. in 30 minutes, held at this temperature for 1.5 hours, and one quartz tube is removed from the furnace 5. This quartz tube is rapidly quenched in water to provide a specimen with the number of 31. The remaining two quartz tubes are gradually cooled to 890° C. in 30 minutes, and held at this temperature for 1.5 hours. One of the two remaining quartz tubes is removed from the furnace 5 and then rapidly cooled in water to provide a specimen with the number of 32. The last quartz tube is gradually cooled to 790° C. in 1 hour and held at this temperature for 1 hour. Thereafter, the last quartz tube is removed from the furnace 5 and rapidly quenched in water to provide a specimen with the number of 33. The measured intensities of light emission i.e. initial values $I_o$ of decay and 1/10 decay time $\tau 1/10$ of the specimens are shown in Table 5, in which the specimen with the number of 34 is made by carrying out the firing at 1000° C. in 8 hours and rapidly quenching similar to the above.

TABLE 5

| Specimen Number | | Initial value $I_o$ | Decay time $\tau_{1/10}$ | $I_o/\tau_{1/10}$ |
|---|---|---|---|---|
| 30 | | 175 | 87 | 2.01 |
| 31 | Ce, Li concentration | 170 | 85 | |
| 32 | $6 \times 10^{-5}$ g-atom/ | 18 | 85 | 0.21 |
| 33 | mol Zn S | 0 | | |
| 34 | | 155 | 90 | 1.72 |
| P46 | | 100 | 120 | 0.83 |

As may be apparent from the comparison of the specimen 31 with that 32 in Table 5, the intensity of light emission is sharply lowered between the temperatures 950° C. and 890° C. That is, it will be guessed that there appear some variations at the luminescent center or thereabout. According to the graph of FIG. 7, the intensity of light emission is decreased lower than 900° C., it is understood that the material is desired to be rapidly quenched from temperature higher than 900° C., preferably 950° C. to fix the crystal before the luminescent center is subjected to variation. In this case, the substantial prolongation of firing time does not cause any lowering of light emission as will be apparent from the fact that the light emission characteristic of the specimen 34, which is made by the long firing time period of 8 hours, is not lowered.

The forming condition of the luminescent center is ascertained. That is, four quartz tubes, each containing the material similar to that of Example 2, are prepared and fired by rapid heating in the same furnace at the temperature of 1000° C. in 2 hours. One of the four quartz tubes is removed from the furnace and then rapidly quenched in water to provide a specimen with the number of 35. The 3 remaining quartz tubes are gradually cooled in the furnace to 900° C. and held at 900° C. for 1 hour. One of the quartz tubes is removed from the furnace and then rapidly quenched similar to the first tube to provide a specimen with the number of 36. The remaining two quartz tubes are rapidly heated up to 1000° C. again (in 3 minutes) and held at this temperature for 1 hour. One of the tubes is removed out from the furnace and rapidly quenched in water to provide a specimen with the number of 37. The last quartz tube is further heated rapidly to 1200° C. from 1000° C. in 8 minutes and held at 1200° C. for 30 minutes. Thereafter, it is removed from the furnace and rapidly quenched in water to provide a specimen with the number of 38. The measured intensities of light emission or initial values $I_o$ of decay of these specimens 35 to 38 and their 1/10 attenuation times $\tau 1/10$ are shown in Table 6.

TABLE 6

| Specimen Number | | Initial value $I_o$ | Decay time $\tau$ | $I_o/\tau_{1/10}$ |
|---|---|---|---|---|
| 35 | | 173 | 90 | 1.92 |
| 36 | $6 \times 10^{-5}$ g-atom/ | 23 | 85 | 0.32 |
| 37 | mol Zn S | 145 | 90 | 1.61 |
| 38 | | 11 | | |
| P46 | | 100 | 120 | |

As clearly shown in Table 6, the specimen 36 is low in intensity of light emission similar to the specimen 32 in Table 5. From the above measured result, it will be understood that when the heated material is gradually cooled down to 900° C., the luminescent centers are annihilated but the luminucent center will be created if the material is heated again up to 1000° C. as the specimen 37, however, the luminescent centers again are annihilated when the material is heated up to 1200° C. as the specimen 38.

Further, three quartz tubes, each containing material 2 in which the Ce and Li concentrations are selected as $6 \times 10^{-5}$, are prepared, then rapidly heated to 1200° C. in a furnace, and held at this temperature in 1 hour to perform firing. One of the tubes is taken out from the furnace and then rapidly quenched in water to provide a specimen 39. The remaining 2 tubes are gradually cooled in the furnace to 1100° C. in 30 minutes and held at this 1100° C. for 1 hour. Then, one of the tubes is taken out from the furnace and rapidly quenched in water to provide a specimen with the number of 40. The remaining or last quartz tube is cooled in succession to 1000° C. and held at this temperature in 1 hour. Then, it is taken out from the furnace and rapidly quenched in water to provide a specimen with the number of 41. The measured initial values $I_o$ and 1/10 decay time $\tau 1/10$ of these specimens 39 to 41 are shown in Table 7.

TABLE 7

| Specimen Number | Initial value $I_o$ | Decay time $\tau_{1/10}$ | $I_o/\tau_{1/10}$ |
|---|---|---|---|
| 39 | 29 | 90 | 0.32 |
| 40 | 58 | 90 | 0.64 |
| 41 | 180 | 88 | 2.05 |
| P46 | 100 | 120 | 0.83 |

From Table 7 it will be understood that the luminescent center is almost not created at 1200° C. but is formed at 1000° C., and hence the creation of the luminescent center has reversibility with respect to the temperature in view of the foregoing.

From the above, the phosphor (ZnCd)S:Ce, M, which is superior in light emission characteristic, can be produced by both the firing at the temperature range of 900° C. to 1170° C., preferably 950° C. to 1080° C. and the rapid quenching.

By the way, in the case that the amount of the material in a quartz tube is too much, when the quartz tube is taken out from a furnace and then cooled by air or water, the material on the wall (peripheral wall and bottom) is superior in light emission characteristic but the material in the central portion of the quartz tube some times has no light emission. This fact is caused by that the material in the central portion of the quartz tube is not rapidly quenched.

We claim as our invention:

1. A method for making a luminescent material having the general formula:

$$Zn_{1-x}Cd_xS:Ce_y, M_z$$

where M is at least one alkali metal selected from Li, Na, K, Rb and Cs, x is from about 0 to about 0.3, y and z are densities (g-atom/mol $Zn_{1-x}Cd_xS$) of Ce and M relative to $Zn_{1-x}Cd_xS$, y is from about $7\times10^{-6}$ to about $1.5\times10^{-2}$, and z is from about $7\times10^{-6}$ to about $1.5\times10^{-2}$ which comprises (1) preparing a mixture of $Zn_{1-x}Cd_xS$, Ce compound in an amount equivalent to y g-atom of Ce/mol $Zn_{1-x}Cd_xS$ and a compound of M which is equivalent to z g-atom of M/mol $Zn_{1-x}Cd_xS$ (2) heating the mixture in a non-oxidizing atmosphere to a temperature between about 900° C. and about 1170° C., said mixture being out of contact with oxygen during the heating, and (3) quenching said mixture by rapid cooling from said heating temperature by removing said mixture from the heating atmosphere and either immersing it in water or by cooling it in air.

2. The method of claim 1 wherein the heating temperature is between 950° C. and 1080° C.

3. A method according to claim 1 wherein said Ce compound is $Ce_2(SO_4)_3$.

4. A method according to claim 1 wherein said Ce compound is $Ce(NO_3)_3$.

5. A luminescent material made according to the method of claim 1 wherein M is lithium.

* * * * *